March 9, 1971 S. W. BRIGGS 3,568,437
POLLUTION CONTROL APPARATUS FOR INTERNAL COMBUSTION ENGINE
Filed April 4, 1969

INVENTOR.
SOUTHWICK W. BRIGGS
BY
Mason, Kolehmainen, Rathburn & Wyss
Attorneys

United States Patent Office 3,568,437
Patented Mar. 9, 1971

3,568,437
POLLUTION CONTROL APPARATUS FOR
INTERNAL COMBUSTION ENGINE
Southwick W. Briggs, 6240 Western Ave.,
Chevy Chase, Md. 20015
Filed Apr. 4, 1969, Ser. No. 813,675
Int. Cl. F01n *3/10;* F02m *23/02*
U.S. Cl. 60—30    6 Claims

ABSTRACT OF THE DISCLOSURE

Air pollution control apparatus for an internal combustion engine of the type including an air intake conduit including a throttle valve therein. The apparatus comprises air valve means for controlling the flow of outside air into said intake conduit downstream of said valve and linkage means for interconnecting the throttle valve and the air valve means to provide for an increase in the flow of outside air into the conduit when the throttle valve is in an engine-idle or substantially closed position and for reducing the percentage of outside airflow into the conduit as the throttle valve is moved from the idle position towards an open or full power position.

---

The present invention relates to a new and improved air pollution control apparatus for an internal combustion engine and is especially adapted to complement the exhaust gas control system shown in the copending United States patent application Ser. No. 710,104, filed Mar. 4, 1968.

Air pollution in and around urban areas in the United States is becoming an ever increasing problem which must be solved. In a recent Department of Commerce study, it is reported that the air pollution produced by exhaust gases from motor vehicles produces sixty percent of the total air pollution factor. The greatest source of air pollution in the exhaust gases of motor vehicles is carbon monoxide and unburned hydrocarbons. Oxides of nitrogen, sulphur oxides, lead components, and particulate material make up the remaining components of pollution in vehicle exhaust gases.

Ehxaust gas pollution control devices are now standard equipment on 1968 automobiles sold in the United States, and these devices are supposedly effective to limit the amount of unburned hydrocarbons in exhaust gases to 275 parts per million and 1½ carbon monoxide, as compared with an average of 990 parts per million of unburned hydrocarbons and 3.5% carbon monoxide present in the exhaust gases of vehicles without air pollution control equipment. Many devices have been suggested and tried in attempting to provide for better combustion of the hydrocarbons and carbon monoxide in the vehicle engine combustion chamber and exhaust systems. However, in many instances the devices have been unsuccessful and have not been able to reduce the pollution to meet present control standards, let alone the future more strict standards to be adopted that have been proposed already. Studies have shown that a major source of air pollution from internal combustion engines is developed during the initial start-up period and while the engine is operating at low speed or at idle condition. One of the reasons attributed to the increased pollution during the above stated operating conditions is the fact that the combustion chamber surfaces and exhaust system surfaces have not attained normal elevated operating temperatures and the cold surfaces permit the carbon monoxide and unburned hydrocarbons in the exhaust gases to pass on out into the atmosphere without further combustion. Another reason is that during an idling or low speed operating condition excess fuel is introduced through the carburetor of the engines for cooling purposes. Much of this excess fuel is not completely combusted and passes out into the atmosphere in the form of carbon monoxide or unburned hydrocarbon.

Therefore, it is an object of the present invention to provide a new and improved air pollution control apparatus for internal combustion engines.

Another object of the present invention is to provide a new and improved air pollution control apparatus for internal combustion engines which reduces the content of unburned hydrocarbon in carbon monoxide in the exhaust gases released from the engine.

Yet another object of the present invention is to provide a new and improved air pollution apparatus of the character described which is especially adapted for reducing air pollution when the engine is operating at a low power setting or idling.

Still another object of the present invention is to provide a new and improved air pollution control apparatus which is especially adapted for reducing air pollution generated during the initial start-up and warm-up period of an engine.

Another object of the present invention is to provide a new and improved air pollution control apparatus which is operable to increase the air-to-fuel ratio of the mixture flowing into the combustion chamber of an internal combustion engine during operation at lower power settings.

Yet another object of the present invention is to provide a new and improved air pollution control apparatus as defined in the preceding object, especially adapted to complement an exhaust gas control system of the type shown in the aforementioned copending patent application.

Yet another object of the present invention is to provide a new and improved air pollution control system for internal combustion engines which can be rapidly and easily installed on an existing internal combustion engine with little modification thereof and at a relatively low cost.

Another object of the present invention is to provide a new and improved air pollution control system of the type described which is operative to introduce outside air into the combustible mixture flowing into the combustion chamber of the engine in a controlled manner, whereby the percentage of additional outside air introduced decreases as the engine operating speed increases.

Another object of the present invention is to provide a new and improved air pollution control apparatus of the character described which is effective to introduce a relatively high percentage of outside air into the mixture flowing into the engine combustion chambers when the engine is operating at an idling condition, which percentage decreases as the engine power increases.

The foregoing and other objects and advantages of the present invention are accomplished by a new and improved air pollution control apparatus for use in an internal combustion engine of the type including an air intake conduit having a throttle valve therein. The pollution control apparatus includes an air valve means for introducing a flow of outside air into the combustible mixture of gases flowing in the intake conduit downstream of the throttle valve, and linkage means is provided for interconnecting the throttle valve and the air valve means to provide for a relatively high percentage of outside air introduced into the inlet conduit when the throttle valve is in a substantially closed, engine idling or low power setting and for reducing the percentage of outside airflow as the throttle valve is moved towards an open or full power position. The control apparatus of the present invention is readily and easily installed on existing engines and is especially useful to complement an exhaust control system, as disclosed and claimed in the aforementioned United States copending patent application Ser. No. 710,-104, filed Mar. 4, 1968.

For a better understanding of the present invention, reference should be had to the following detailed description taken in conjunction with the accompanying drawings, in which.

Figure 1:
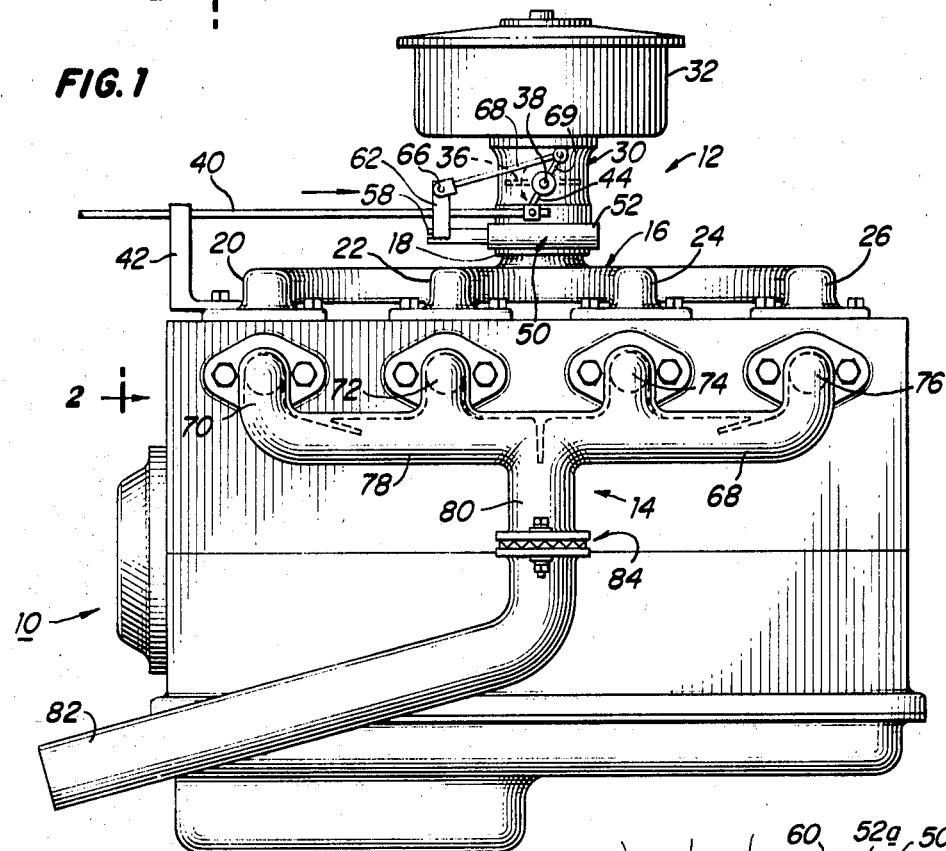
FIG. 1 is a side elevational view of a typical internal combustion engine with an air pollution control apparatus of the present invention installed thereon.
Figure 4:
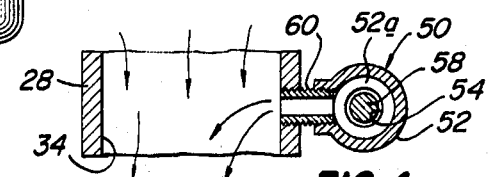
FIG. 4 is an enlarged, fragmentary, sectional view taken substantially along line 4—4 of FIG. 3.
Figure 2:
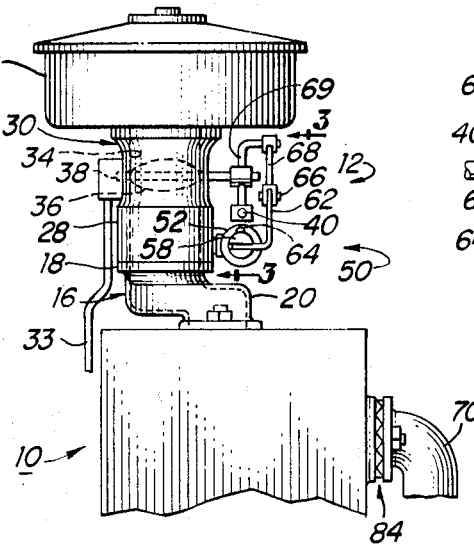
FIG. 2 is a rear elevational view of the engine looking in the direction of arrow 2—2 of FIG. 1.

Referring now, more particularly, to the drawings, therein is illustrated a multicylinder, internal combustion engine 10 which includes an induction system, indicated generally as 12, for introducing a combustible mixture into the cylinders of the engine and an exhaust system indicated generally as 14 for removing exhaust gases from the cylinders. The induction system 12 includes an intake manifold 16 having a flanged inlet 18 (FIG. 2) and a plurality of branch ducts 20, 22, 24, and 26 (FIG. 1) for directing combustion gases into each of the cylinders of the engine. A combustible mixture of fuel and air is supplied to the flanged inlet end 18 of the intake manifold 16 through a tubular conduit or connector 28 which supports a carburetor 30. Air is supplied to the carburetor through an air filter 32, and gasoline is supplied through gas line 33 (FIG. 2) for introduction into the carburetor throat 34 having a conventional butterfly-type throttle valve 36 therein for regulating the flow of fuel-air mixture supplied to the cylinders of the engine. The butterfly-type throttle valve 36 is mounted on a pintle pin 38 extending transversely through the throat conduit 34, and the butterfly valve is movable between a substantially closed, engine-idling or minimum power setting, shown in FIG. 1, where the flow past the carburetor throttle valve is at a minimum, to a full power setting (not shown) wherein the butterfly valve 36 is open and substantially parallel to the direction of gas flow in the throat conduit to permit a maximum unobstructed flow through the throat conduit.

Movement of the butterfly valve 36 between the substantially closed idle or low power setting and the substantially open or full power setting is accomplished by a horizontally reciprocal throttle control member or rod 40 supported in a bracket 42 mounted on the engine head. The forward end of the throttle control rod 40 is interconnected to pivotally move the butterfly valve supporting pintle pin 38 by means of radial arm linkage 44 and the rearward end of the rod is connected by suitable linkage (not shown) to a foot feed pedal or other throttle control member in the passenger compartment so that the vehicle operator can control the engine speed. When the throttle control rod 40 is moved forwardly in the direction of the arrow (FIG. 1), the buttefly valve 36 is pivoted in a counterclockwise direction from the closed, idle or low power setting, as shown, toward an open or high power setting for increasing the flow of combustion gases into the intake manifold 16. When pressure on the foot feed or other throttle control device in the passenger compartment of the vehicle is released, a suitable bias spring (not shown) is provided to return the throttle control rod rearwardly to the original idle or low power setting.

In accordance with the present invention, the short inlet connector 28 is interposed downstream of the throttle valve 36 between the lower outlet end of the carburetor throat conduit 34 and the flanged upper inlet end 18 of the inlet manifold 16 in order to support an outside air valve assembly, generally referred to by the reference numeral 50. The outside air valve assembly is provided for the purpose of introducing excess outside air into the combustion mixture delivered by the carburetor to the engine cylinder. The amount of excess outside air introduced by the air valve assembly 50 depends upon and is correlated with the setting or position of the throttle butterfly valve 36 so that a maximum percentage of outside air is introduced when the throttle valve is at a substantially closed, idle, or low power setting. When the engine is idling or operating at the low power range, the pressure in the intake system downstream of the throttle valve is at a low value and generally substantially less than atmospheric. As the throttle valve is opened and the engine power is increased, the pressure in the intake manifold rises and approaches atmospheric pressure. The flow rate of combustion mixture through the intake system 12 is roughly proportional to the throttle valve setting and the engine power.

The valve assembly 50 is mechanically linked with the butterfly valve 36 and throttle control rod 40 and includes an elongated, hollow, tubular valve housing 52 disposed on a horizontal axis. The valve housing 52 is formed with an annular, inwardly directed, flange 52a at the forward end which defines a circular inlet port 54 for introducing outside air into the valve chamber. The rearward end of the valve assembly housing 52 is formed with an inwardly directed annular flange 52b having a recess therein to accommodate an O-ring 56 for sealing against the body portion 58a of an elongated sliding valve member 58 which is adapted to cooperate with the port 54 to control the flow of outside air into the valve chamber. The valve chamber is in communication with the connector 28 and is supported on a threaded nipple 60 (FIG. 3) connected into an opening 52c formed in the side of the valve chamber midway between the ends. If suitable area is available on the conduit wall forming the carburetor throat 34, the connector member 28 may be eliminated altogether, and the threaded nipple 60 is directly threaded into a tapped opening drilled in the wall forming the carburetor throat. The nipple 60 supports the elongated valve chamber 52 from the carburetor or connector structure and provides for communication between the interior of the valve chamber and the interior of the conduit or passage which supplies the combustible mixture of gases to the inlet manifold 16. The body portion 58a of the valve member 58 is generally cylindrical and, in the position of FIG. 3, extends rearwardly behind the rearward end flange 52b of the valve chamber. For the purpose of mechanically interconnecting and linking the operation of the throttle control valve 36 with the outside air valve assembly 50, an L-shaped connector 62 is provided and a setscrew 64 is used for removably connecting the lower end or horizontal leg of the connector with the rearward end portion of the valve member 58.

The upper end of the vertical leg of the connector 62 is pivotally connected by a pin 66 to the rear end of a linkage rod 68 and the forward end of the rod 68 is pivotally connected to the outer end of a radius arm 69 mounted on the throttle valve pivot axle 38 and extending in a direction opposite to the radius arm 44 which is connected to throttle control rod 40. Accordingly, when the control rod 40 is moved forwardly in the direction of the arrow (FIG. 1), the throttle valve 36 is moved from a horizontal, substantially closed, idle position in a counterclockwise direction to a substantially vertical, fully open or full power position, while at the same time the outside air valve member 58 is moved from a forward position (FIG. 3, dotted lines) wherein a tapered forward end portion 58b is partially blocking the port 52a to a rearward or retracted position (sold lines) wherein the forward tip of the valve member is spaced rearwardly of the port at the forward end of the valve chamber.

The frustoconically tapered forward end portion 58b of the valve member 58 tapers from a minimum diameter at the forward end or tip to a maximum diameter at the rear equal to the diameter of the valve body 58a.

Figure 3:
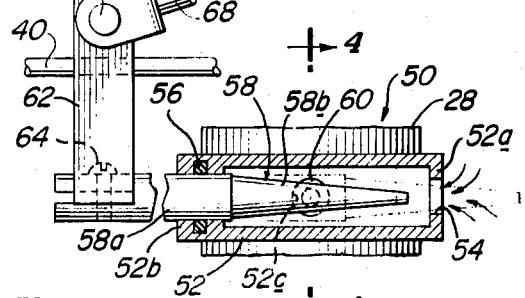
FIG. 3 is an enlarged, fragmentary, sectional view of the air pollution control apparatus in accordance with the present invention taken substantially along line 3—3 of FIG. 2.

The tapered valve portion 58b, in conjunction with the rising pressure in the intake system as the valve member 58 moves rearwardly upon opening of the throttle valve 36, provides for a decrease in the percentage amount of outsair airflow introduced into the valve chamber 52 through the port 54 as the engine goes from idle to full power. The maximum diameter of the valve member 58 is less than the internal diameter of the valve chamber 52 between the end flanges 52a and 52b so that air may flow through the port 52c into the nipple when the forward end of the body portion 58a is forward of the port. In FIG. 3, the valve member 58 is shown in solid lines in a rearward position wherein the engine is operating at a full or maximum power setting, and in this position the tapered forward end portion 58b of the valve offers little or no obstruction to the free flow of outside air through the port 54, into the valve chamber 52 and out through the side port 52c into the nipple 60, but because the intake manifold pressure approaches atmospheric at high engine power setting there is a relatively small or minimal percentage of outside air introduced into the intake system through the open valve assembly 50.

As the power setting of the engine is decreased by rearward travel of the throttle control rod 40, the tapered valve portion 58b moves forwardly and begins to restrict the airflow through the port 54 to accurately meter the percentage of outside airflow into the system. When the throttle or butterfly valve 36 is at a substantially closed or engine-idling position, the forward end portion 58b of the valve member 58 extends into the port 54 and is in a full forward position, as shown in dotted lines. At an engine-idling condition, the greatest pressure difference between the mixture in the intake system and the outside ambient air is present, and a maximum percentage of outside air is introduced into the relatively low volume flow in the the engine intake system around the valve portion 58b through the port 54.

The carburetor throat 34 is considerably larger in cross-sectional flow area than the area of the outside air port 54, so that as the throttle valve 36 is opened wider, the effect of outside airflow into the system through the port diminishes in percentage of the total flow entering the cylinder of the engine for combustion. For example, in the vehicle engine tested and described hereinafter, the carburetor throat was approximately 1¼ inch in diameter and the outside air port was only ⅜ inch in diameter. With these parameters, the air-fuel ratio was increased significantly in the idle and low power range and was not materially affected in the higher power range even through the valve member 58 was fully retracted from the port 54, as shown in FIG. 3, leaving the port unrestricted for the flow of outside air.

In addition to the system described for introducing excess outside air into the intake manifold, the engine 10 is also equipped with an exhaust gas control system of the type described in the aforementioned copending U.S. patent application Ser. No. 710,104, filed Mar. 4, 1968. This exhaust gas control system will be described only briefly herein and includes an exhaust manifold 68 having a plurality of separate flanged, inlet branch ducts 70, 72, 74, and 76, for receiving exhaust gases from the respective cylinders of the engine. The branch ducts are connected to a common conduit 78 and an outlet branch 80 is provided to direct the gases into an exhaust pipe 82 leading to suitable muffler means not shown.

A pulse-type venturi pump 84 (FIG. 2), as shown and described in the aforementioned copending patent application is positioned between the inlet flange of each exhaust branch duct 70, 72, 74, and 76, and the adjacent outlet ports of the associated engine cylinders. Each pulse-type venturi pump 84 introduces some outside air into the exhaust manifold 68 to provide for more complete combustion of any unburned hydrocarbons and carbon monoxide in the exhaust gases. A similar pulse-type venturi pump 84 is mounted (FIG. 1) between the flanged end of the outlet branch 80 of the manifold 68 and the inlet of the exhaust pipe 82 to provide an additional introduction of outside air into the exhaust gases. Operation of the exhaust gas control system is fully described in the aforementioned patent application copending herewith, and it is sufficient herein to understand that the exhaust gas control system provides for more complete combustion of exhaust gases by introducing a controlled flow of outside air into the exhaust system.

By introducing a controlled flow of outside air into the intake side of the engine intake manifold 16, it has been found that the amount of carbon monoxide and unburned hydrocarbons present in the exhaust gases can be reduced, and the reduction is especially significant when the engine is operating at an idle or low power setting as well as when the engine is initially started and warmed up. The amount of excess air introduced into the intake manifold is automatically reduced as the engine power is increased so that excess air dilution does not occur. In a test conducted on a 1967 Chevrolet, six cylinder, automobile engine having a piston displacement of 250 cubic inches and equipped with a pollution control intake valve assembly 50 as described in accordance with the invention, it has been found that the amount of unburned hydrocarbon in the exhaust gas is reduced significantly down to a range of 40 to 60 parts per million, with the engine operating at the standard idle speed. Moreover, a considerably higher, air-to-fuel ratio of about 14 to 1 has been attained at idle power settings on the tested engine. The valve assembly 50 on the tested engine was constructed with the port 54 being ⅜-inch in diameter and with a 3-inch stroke or movement of the control rod 40 from an idle to a full power position, the valve portion 58b was uniformly tapered from ⅛-inch diameter at the tip to a full ⅜-inch diameter about 3 inches rearwardly of the forward end.

In road tests on the Chevrolet vehicle equipped with the intake pollution control system as described herein, it was found that a relatively high air-fuel ratio was maintained and that the ratio was relatively constant at about 14 to 1 all the way from an idle power setting up until the car reached a speed of about 60 miles per hour on a level road. This air-fuel ratio is considerably higher than that attained in a similar vehicle not equipped in accordance with the invention. The increased air-fuel ratio at idle and low power settings of operation results in a significant reduction in the amount of unburned hydrocarbons and carbon monoxide in the exhaust gases and is especially effective in reducing pollution caused when the engine is initially started and warmed up. With the test vehicle additionally equipped with an exhaust pollution control system as described herein and in the aforementioned copending patent application, as the valve member 58 automatically reduces the excess intake air through the port 54 at higher power settings the exhaust temperature is still maintained at a relatively high level because of the action of the pulse-type venturi pumps 84 in the exhaust system 14 which introduce increasing amounts of outside air on the exhaust side of the engine for additional burning of the unburned hydrocarbons and the carbon monoxide. It is believed that the intake and exhaust system described cooperate and complement one another when installed on an engine with the intake system being effective in the low range of power settings and the exhaust system taking effect at the higher range of power settings. In a test vehicle equipped with complementary intake and exhaust pollution control systems, exhaust gas temperatures of 1100°–1200° F. were maintained from idle to maximum power settings and the amount of unburned hydrocarbons in the exhaust gases was maintained in the range of 40 to 60 parts per million.

The valve assembly 50 of the present invention is adapted for installation on existing internal combustion engines by the use of a connector 28 or, in some cases where the carburetor throat is of a sufficient size and readily accessible, a separate connector is not needed and the nipple 60 can be threaded directly into a tapped opening drilled in the side of the carburetor throat. The invention results in better fuel economy for the engine in addition to reducing the amount of air pollutants present in the exhaust gases, especially when the engine is operating in the idle position or lower power settings. The valve assembly 50 is relatively inexpensive and can be installed and connected on most internal combustion engines with little trouble.

Moreover, when the intake air pollution control system described is used in complement with an exhaust gas pollution control system, as described in the aforementioned copending patent application, even greater improvement in operating economies and reduced air pollution are attained.

What is claimed as new and desired to be secured by Letters Patent of the United States is:

1. An air pollution control system for an internal combustion engine of the type including an intake conduit with a throttle valve therein and an exhaust conduit, said system including outside air valve means for controlling the introduction of outside air into said intake conduit downstream of said throttle valve, mechanical linkage means interconnecting said throttle valve and said outside air valve means for providing a maximum input of outside air into said intake conduit through said valve means when said throttle valve is in an engine idling, low power position and reducing said outside air input toward a minimum as said throttle valve is moved from said idling, low power position toward a full power position, and venturi means independent of said valve means for introducing outside air into said exhaust conduit for more complete oxidation of the unburned components in the engine exhaust gases.

2. The air pollution control apparatus of claim 1 wherein said valve means includes a housing structure in communication with said intake conduit and having port means defined therein in communication with the atmosphere, and a tapered valve member movable toward and away from said port means.

3. The air pollution control apparatus of claim 2 wherein said housing structure comprises an elongated tubular member with said port means defined in an end wall thereof and said valve member is disposed for longitudinal sliding movement in said tubular member.

4. The air pollution control apparatus of claim 3 wherein said valve member is frustoconically tapered from a minimum at one end adjacent said port means.

5. The air pollution control apparatus of claim 2 wherein said housing structure includes threaded coupling means for connection with said intake conduit.

6. The air pollution control apparatus of claim 3 wherein said linkage means includes an elongated rod means reciprocally movable for moving said throttle valve between said idle and full power position and a connector attached to said rod means and said valve member for moving the latter in response to movement of said throttle valve.

References Cited
UNITED STATES PATENTS

| | | | |
|---|---|---|---|
| 3,224,424 | 12/1965 | Mennicken | 123—119 |
| 1,102,303 | 7/1914 | Sly | 123—124 |
| 1,375,610 | 4/1921 | Schmidt | 123—119 |
| 1,547,703 | 7/1925 | West | 123—119 |
| 1,916,257 | 7/1933 | Dubina | 123—119 |
| 3,364,909 | 1/1968 | Mick | 123—124 |

FOREIGN PATENTS

| | | | |
|---|---|---|---|
| 191,123 | 12/1922 | Great Britain | 123—119 |
| 298,672 | 12/1915 | Germany | 123—124 |
| 739,715 | 11/1955 | Great Britain | 60—30 |

DOUGLAS HART, Primary Examiner

U.S. Cl. X.R.

123—119, 124